H. W. NORDYKE.
SEPARATOR FOR STORAGE BATTERIES.
APPLICATION FILED SEPT. 18, 1917.
1,313,324.
Patented Aug. 19, 1919.
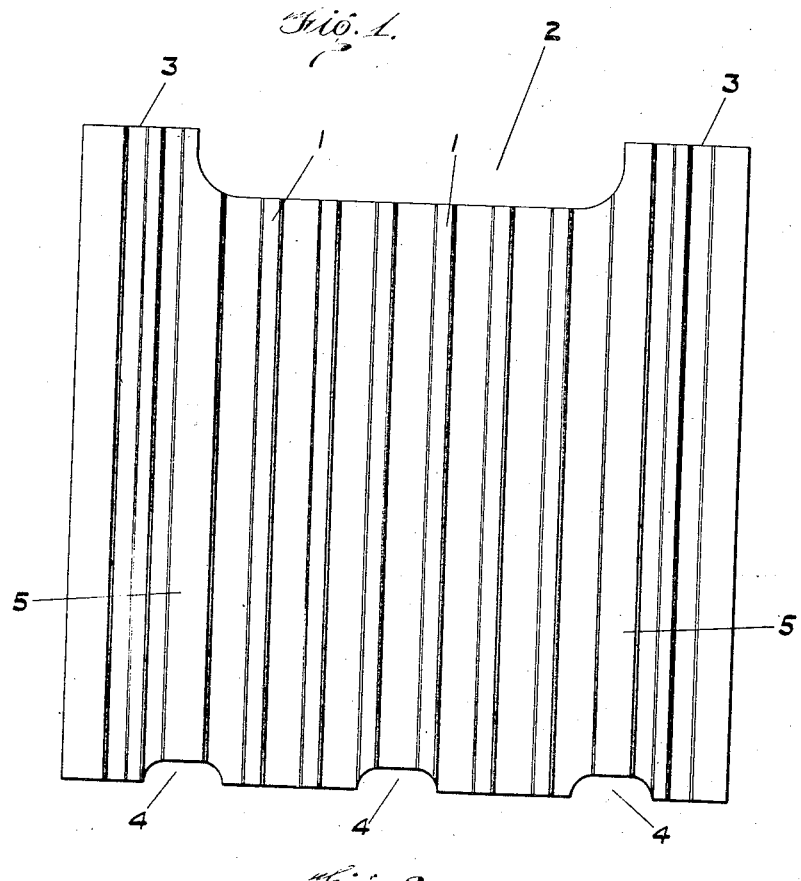
WITNESS.
Walter H. Troemel.
INVENTOR
Horace W. Nordyke
BY
Bradford & Doolittle
ATTORNEYS

UNITED STATES PATENT OFFICE.

HORACE W. NORDYKE, OF INDIANAPOLIS, INDIANA, ASSIGNOR TO INDIANAPOLIS MANUFACTURING COMPANY, OF INDIANAPOLIS, INDIANA, A CORPORATION OF INDIANA.

SEPARATOR FOR STORAGE BATTERIES.

1,313,324. Specification of Letters Patent. Patented Aug. 19, 1919.

Application filed September 18, 1917. Serial No. 191,938.

*To all whom it may concern:*

Be it known that I, HORACE W. NORDYKE, a citizen of the United States, residing at Indianapolis, Marion county, and State of Indiana, have invented and discovered certain new and useful Improvements in Separators for Storage Batteries, of which the following is a specification.

My invention relates to separators for storage batteries and its object is to provide an article of this class having means whereby the thin body of the separator is effectually strengthened and prevented from splitting at the points where it is subjected to the greatest stress.

With this object in view my invention is embodied in preferable form in the separator hereinafter described and illustrated in the accompanying drawings.

In said drawings Figure 1 shows a side view of one of the separators embodying my said invention, and Fig. 2 a top edge view thereof.

Referring to the drawings, the separator is made of a thin sheet of wood and is provided on one side thereof with alternate vertical ribs and grooves adapted to space the separator from the adjoining plate and permit the circulation of the battery liquid between the separator and plate. These ribs are indicated by the numeral 1. These ribs are made as narrow as possible, consistent with affording a bearing against the adjoining plate, in order that wide grooves for the liquid may be left. In the form of the separator herein shown the same is provided at its upper end with a transverse recess 2 leaving the projecting lugs 3 at its corners corresponding in location to the terminal lugs of the battery plates. In its lower edge the separator is provided with a series of three curved, cut out recesses or notches 4 which are adapted to fit upon and engage bridge members mounted in the bottom of the battery cell.

Forming part of the end wall of the upper recess of the separator and forming the curved corner portion of said recess, and extending vertically of the separator and meeting the upper wall of each of the outer curved recesses 4 is a rib 5 which is widened beyond the width of the other ribs and constitutes a strengthening and stiffening member for the separator at the points where it is mainly supported upon the bridges. These widened ribs thicken and stiffen the body of the separator directly opposite the lower cut out recesses and prevent the body from being split at this point under the effect of any movement caused by shocks and jars imparted to the battery plates and also prevent splitting of the separator at the corners of the upper recesses. It is necessary in these separators that the main series of ribs be comparatively narrow in order to leave relatively wide channels for the passage of the liquid between the same, and if all the ribs were made sufficiently wide to strengthen the body of the separator throughout its entire area this function would be destroyed. The provision of the widened ribs at only the points of support, however, does not seriously detract from this function, and at the same time greatly increases the durability of the separator. The recesses at the bottom of the separator which engage the bridges are of advantage in preventing lateral displacement of the separator.

Having thus described my invention, what I claim is:—

A separator for storage battery plates having bridge receiving notches formed in its lower end and upwardly projecting lugs on its upper end, two of said bridge receiving notches being in vertical alinement with the inner edges of said lugs, said separator being formed with narrow vertical strengthening and spacing ribs and with a pair of relatively wide ribs connecting the inner edges of said lugs and their alined bridge receiving notches, substantially as set forth.

In witness whereof, I have hereunto set my hand and seal at Indianapolis this 15th day of August, A. D. nineteen hundred and seventeen.

HORACE W. NORDYKE. [L. S.]

Witnesses:
H. P. DOOLITTLE,
M. L. SHULER.